(12) United States Patent
Ogawa

(10) Patent No.: US 11,405,526 B2
(45) Date of Patent: Aug. 2, 2022

(54) ELECTRONIC DEVICE THAT PERFORMS SETUP USING RECEIVED COMMUNICATION INFORMATION AND NON-TRANSITORY COMPUTER-READABLE RECORDING MEDIUM THEREFOR

(71) Applicant: BROTHER KOGYO KABUSHIKI KAISHA, Nagoya (JP)

(72) Inventor: Kazuaki Ogawa, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/210,777

(22) Filed: Mar. 24, 2021

(65) Prior Publication Data

US 2021/0306521 A1    Sep. 30, 2021

(30) Foreign Application Priority Data

Mar. 26, 2020    (JP) .............................. JP2020-056107

(51) Int. Cl.
| | |
|---|---|
| H04N 1/44 | (2006.01) |
| H04W 76/10 | (2018.01) |
| H04W 12/06 | (2021.01) |
| H04N 1/00 | (2006.01) |
| H04W 12/08 | (2021.01) |

(52) U.S. Cl.
CPC ....... *H04N 1/4413* (2013.01); *H04N 1/00307* (2013.01); *H04N 1/00411* (2013.01); *H04W 12/06* (2013.01); *H04W 12/08* (2013.01); *H04W 76/10* (2018.02)

(58) Field of Classification Search
CPC ............ H04N 1/4413; H04N 1/00307; H04N 1/00411; H04W 12/06; H04W 12/08; H04W 76/10; H04W 48/00
See application file for complete search history.

(56) References Cited

U.S. PATENT DOCUMENTS

| | | |
|---|---|---|
| 2017/0026834 A1 | 1/2017 | Nakajima |
| 2017/0041400 A1 | 2/2017 | Asakura et al. |
| 2021/0307086 A1* | 9/2021 | Shiotani ................ H04W 12/08 |

FOREIGN PATENT DOCUMENTS

| | | |
|---|---|---|
| JP | 2019-126083 A | 7/2019 |
| JP | 2020-17968 A | 1/2020 |

* cited by examiner

*Primary Examiner* — Juan M Guillermety
(74) *Attorney, Agent, or Firm* — Scully, Scott, Murphy & Presser, PC

(57) ABSTRACT

According to an information transmission app, a CPU of an information processing terminal is configured to obtain connection information of an access point of wireless network and determine whether there exists an electronic device having completed the setup. When determining that there exists an electronic device having completed the setup, the CPU determines whether to transmit the connection information to an other electronic device. Further, when determining that there exists the first electronic device having completed the setup or when determining that the connection information is to be transmitted to the other electronic device, the CPU transmits the connection information to the other electronic device, and when determining that that the connection information is not to be transmitted, the CPU does not transmits the connection information. The other electronic device completes the setup using the connection information transmitted from the information processing terminal.

13 Claims, 6 Drawing Sheets

ELECTRONIC DEVICE THAT PERFORMS SETUP USING RECEIVED COMMUNICATION INFORMATION AND NON-TRANSITORY COMPUTER-READABLE RECORDING MEDIUM THEREFOR

CROSS-REFERENCE TO RELATED APPLICATIONS

This application claims priority under 35 U.S.C. 119 from Japanese Patent Application No. 2020-056107 filed on Mar. 26, 2020. The entire subject matter of the application is incorporated herein by reference.

BACKGROUND

Technical Field

The present disclosures relate to an electronic device and a non-transitory computer-readable recording medium storing programs for connecting to a wireless network.

Related Art

In recent years, a communication system in which a plurality of electronic devices is connected to a wireless network via an access point is known. In order to connect a plurality of electronic devices to a wireless network, each electronic device needs to be set up to connect to an access point of the wireless network using connection information.

Conventionally, there has been known a smartphone, which is configured to take a picture of a two-dimensional code attached to a housing of an access point with a camera of the smartphone, obtains a communication parameter, which is connection information, from the two-dimensional code, and then transmits the communication parameter obtained from the access point to a printer. The printer performs a setup using the received communication parameter.

SUMMARY

By allowing an information processing terminal such as a smartphone to obtain connection information from a taken image and pass the connection information to an electronic device such as a printer, a user's work for the setup of the second electronic device becomes easier. However, if the connection information used for the setup is unnecessarily passed, the electronic device could easily be connected to a low-security wireless network. Therefore, the security of the electronic device becomes an issue, such as the unauthorized use of the electronic device.

According to aspects of the present disclosure, there is provided a non-transitory computer-readable recording medium for an information processing terminal having a computer, the recording medium containing computer-executable instructions which realize a program, the instructions cause, when executed by the computer, the information processing terminal to perform an obtaining process of obtaining connection information which is used for a setup to connect to an access point of a wireless network, a setup completion determining process of determining whether there exists an first electronic device having completed the setup, when it is determined in the setup completion determining process that there does not exist the first electronic device having completed the setup, a transmission determining process of determining whether or not to transmit the connection information obtained in the obtaining process to a second electronic device, and a transmitting process of at least one of when it is determined in the setup completion determining process that there exists the first electronic device having completed the setup and when it is determined in the transmission determining process that the connection information is to be transmitted to the second electronic device, transmitting the connection information obtained in the obtaining process to the second electronic device, and when it is determined in the transmission determining process that the connection information is not to be transmitted to the second electronic device, not transmitting the connection information to the second electronic device. The second electronic device is configured to complete the setup using the connection information transmitted, in the transmitting process, from the information processing terminal.

According to aspects of the present disclosure, there is provided a non-transitory computer-readable recording medium for an information processing terminal having a computer, the recording medium containing computer-executable instructions which cause, when executed by the computer, the information processing terminal to perform an obtaining process of obtaining connection information which is used for a setup to connect to an access point of a wireless network, a setup completion determining process of determining whether there exists a first electronic device having completed the setup, and a transmitting process of transmitting the connection information obtained in the obtaining process to a second electronic device when it is determined, in the setup completion determining process, that there exists the first electronic device having completed the setup, and not transmitting the connection information to the second electronic device when it is determined, in the setup completion determining process, that the exists no first electronic device having completed the setup. The second electronic device is configured to complete the setup using the connection information received from the information processing terminal.

According to aspects of the present disclosure, there is provided an electronic device, comprising a communication interface, and a computer. The computer is configured to perform a receiving process of receiving connection information used for a setup to connect to an access point of a wireless network from an information processing terminal through the communication interface. The information processing terminal being configured to perform obtaining the connection information, and transmitting the obtained connection information to the electronic device at least one of when it is determined that there exists an other electronic device, which is different from the electronic device, having completed the setup and when the connection information is to be transmitted to the electronic device even if there exists no other electronic device having completed the setup. The computer is further configured to perform, when the connection information is received in the receiving process a setup process of completing the setup using the received connection information, and a setup result transmitting process of transmitting a result of the setup in the setup process to the information processing terminal through the communication interface.

DETAILED DESCRIPTION OF THE EMBODIMENTS

Initially, an embodiment of a communication system according to aspects of the present disclosures will be described in detail below, with reference to the accompanying drawings. This embodiment discloses a system including an information processing terminal configured to execute a program and an electronic device, which communicates wirelessly via a wireless network.

Figure 1:
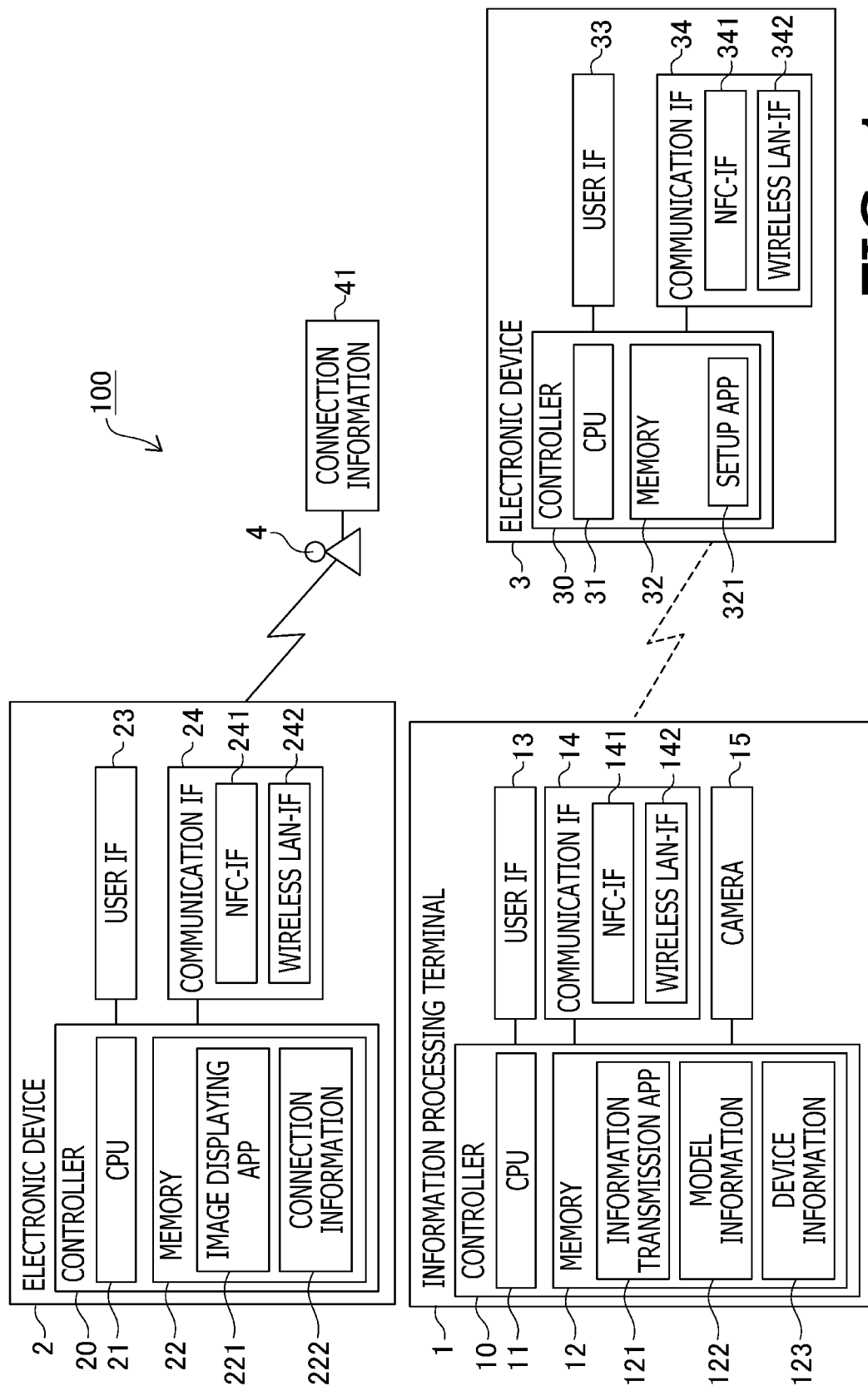
FIG. 1 is a schematic diagram of a communication system in accordance with an embodiment.

As shown in FIG. 1, a communication system 100 in this embodiment includes an information processing terminal 1, a plurality of electronic devices including an electronic device 2 and an electronic device 3, and an access point 4 of a wireless network. The information processing terminal 1 is a portable device, e.g., a smartphone or a tablet computer.

The access point 4 is a communication device for connecting various devices to a wireless network, such as the Internet or a LAN, by means of Wi-Fi (registered trademark) wireless communication, based on the IEEE 802.11 standard and its equivalent standards. Each access point has its own unique connection information set. A device using the access point 4 must complete a setup, which is a procedure for connecting the device to the access point 4, using the connection information of the access point 4.

The connection information is, for example, a pair of identifier of the access point 4 (hereinafter, referred to as "SSID") and a password corresponding to the SSID. The device performing the setup sends the correspondingly set password to the access point 4 specified by the SSID and completes the setup by obtaining the IP address issued by the access point 4. The connection information may be one piece of authentication information (Wi-Fi Easy Connect connection information), which is a combination of the SSID and the password. It is noted that the SSID is an example of identification information of the wireless network.

On a housing of the access point 4 and on an accompanying instruction manual, labels showing connection information 41 of the access point 4 are provided. The connection information 41 contained on the labels is, for example, a character string including the SSID and password, or a QR code (registered trademark) including the SSID and password.

As shown in FIG. 1, the information processing terminal 1 in this embodiment is equipped with a controller 10 including a CPU 11 and a memory 12. The information processing terminal 1 is also provided with a user interface (hereinafter, referred to as "user IF") 13, a communication interface (hereinafter referred to as "communication IF") 14, and a camera 15, which are electrically connected to the controller 10. The controller 10 in FIG. 1 is a generic term that summarizes hardware and software used to control the information processing terminal 1 and does not necessarily represent a single piece of hardware that actually exists in the information processing terminal 1.

The CPU 11 executes various processes in accordance with programs read from the memory 12 and based on user operations. The CPU 11 is an example of a computer. The memory 12 is a storage area used to store various programs, such as a startup program for starting the information processing terminal 1, various application programs (hereinafter, referred to as "applications") and the like, various pieces of data such as image data and document data, and various setting information. The memory 12 is also used as a work area in which various processes are performed.

The user IF 13 includes hardware that displays a screen for informing the user of information, and hardware that receives operations by the user. An example of the user IF 13 is a touch panel. The user IF 13 may be a combination of a display and a keyboard, a mouse, a trackball, and the like.

The communication IF 14 includes various hardware for communicating with an external device. The communication IF 14 includes, for example, an NFC interface (hereinafter, referred to as "NFC-IF") 141, a wireless LAN interface (hereinafter, referred to as "wireless LAN-IF") 142n. The NFC-IF 141 is an interface that enables wireless communication in accordance with the NFC method based on the international standards of ISO/IEC 21481 or ISO/IEC 18092. The wireless LAN-IF 142 is an interface that enables wireless communication in accordance with the Wi-Fi method. The communication IF 14 may further include configurations for other communication standards, e.g., Bluetooth (registered trademark) or hardware for wired communication.

The camera 15 is a device configured to take images and generate image data. The information processing terminal 1 has a function to analyze the image data generated by the camera 15 and to obtain information in the image. For example, if the obtained image indicates a two-dimensional code, the information processing terminal 1 can obtain information about characters included in the two-dimensional code. The information processing terminal 1 has, for example, a character recognition function, and if the obtained image is an image of characters, information of the characters in the image can be obtained.

The memory 12 of the information processing terminal 1 in this embodiment stores an information transmission app 121, model information 122, and device information 123, as shown in FIG. 1. The information transmission app 121 is a program configured to cause a device that has not yet been set up to connect to the access point 4, for example, to complete the setup. The information transmission app 121 is an example of a program.

The model information 122 is information stored in association with the information transmission app 121, and is information indicating a model of an electronic device to be processed by the information transmission app 121. The model information 122 may be information hard-coded into the information transmission app 121, information stored in an external device such as a server and obtained by an inquiry from the information transmission app 121, or information accessible from the information transmission app 121 when the information transmission app 121 is installed. The information may be stored in a particular storage area.

Device information 123 is information that identifies an electronic device that has been set up for connecting with the access point 4. Information contained in the device information 123 is, for example, an IP address, a MAC address, a serial number, and a device name of each electronic device. At the time of installation of the information transmission app 121, no information is contained in the device information 123. The information processing terminal 1 obtains information from the targeted electronic device by executing the information transmission app 121, for example, and stores the obtained information in the device information 123. The information processing terminal 1 may receive information about the device information from a local server or the like, or the information may be obtained by user input.

Each of the electronic device 2 and the electronic device 3 of this embodiment is a device having at least a wireless communication function, e.g., an MFP, a printer, a scanner, a facsimile device, a sewing machine, a camera and the like. The electronic device 2 and the electronic device 3 may be the same kind of device or a different kind of device. The electronic device 2 and the electronic device 3 may be the same type of device and may be the same model or different models.

The electronic device 2 has a controller 20 including a CPU 21, a memory 22, as shown in FIG. 1. The electronic device 2 also has a user IF 23 and a communication IF 24, which are electrically connected to the controller 20. The user IF 23 includes, for example, a touch screen, and hardware that displays a screen for informing the user of information, and hardware that receives operations by the user. The user IF 23 is an example of a user IF having a displaying function. The communication IF 24 includes an NEC-IF 241 and a wireless LAN-IF 242, and may also include a configuration corresponding to other communication standards, e.g., hardware for Bluetooth or wired communication.

The electronic device 3 has a controller 30 including a CPU 31, a memory 32, as shown in FIG. 1. The electronic device 3 also has a user IF 33 and a communication IF 34, which are electrically connected to the controller 30. The user IF 33 includes, for example, a touch panel and hardware for displaying a screen for informing the user of information, and hardware for receiving operations by the user. The communication IF 34 includes, for example, an NFC-IF 341 and a wireless LAN-IF 342, and may also include a configuration corresponding to other communication standards, e.g., hardware for Bluetooth or wired communication. The CPU 21 of electronic device 2 and the CPU 31 of electronic device 3 are examples of a computer.

The electronic device 2 and the electronic device 3 have configurations for realizing functions of the respective devices in addition to the configurations shown in the drawings. For example, when the electronic device is a printer, it has a configuration for printing, and if the electronic device is a scanner, it has a configuration for scanning an image.

Both the electronic device 2 and the electronic device 3 are in a state of detecting an information processing terminal capable of performing the NFC wireless communication in response to a signal periodically output from the NFC-IF 241 or the NFC-IF 341 while the power is on. For example, when the information processing terminal 1 with the NFC function enabled comes within a particular distance of the NFC-IF 241 or NFC-IF 341, the electronic device 2 or the electronic device 3 detects that the information processing terminal 1 has approached, and the wireless communication between the information processing terminal 1 and the electronic device 2 or electronic device 3 is automatically enabled using the NFC method. It is noted that the information processing terminal 1 is a portable device, and the user can easily bring the NFC-IF 141 of the information processing terminal 1 into proximity with the NFC-IF 241 of electronic device 2 or the NFC-IF 341 of electronic device 3.

Each of the electronic device 2 and the electronic device 3 is further equipped with a wireless LAN access point function and is capable of supporting a Wi-Fi direct (hereinafter, referred to as "WFD") type wireless communication. In other words, the electronic device 2 and the electronic device 3 each store connection information according to the WFD method and have a function to construct a network with the client device as a group owner device that manages the network. The WFD system is different from the NFC system in that the WFD system has a wider communication range and a higher communication speed than the NFC system.

Concretely, each of the electronic device 2 and the electronic device 3, for example, transmits the WFD connection information of its own device in the NFC format when the wireless communication of the NFC format becomes possible. When the information processing terminal 1 receives the WFD connection information according to the NFC method, the information processing terminal 1 transmits the received WFD connection information via wireless LAN-IF 142 to enable the WFD communication with the electronic device 2 or the electronic device 3 as a client device.

The memory 22 of the electronic device 2 stores an image display app 221 and connection information 222. The image display app 221 is a program configured, in association with the information transmission app 121 of the information processing terminal 1, to perform a process of displaying an image including the connection information 222 on the user IF 23 as a process for passing the connection information 222 stored in the memory 22 to other devices. The connection information 222 is information including the SSID and the password of the access point 4. The electronic device 3 may also have an image display app.

A setup app 321 is stored in the memory 32 of the electronic device 3. The setup app 321 is a program configured, in association with the information transmission app 121 of the information processing terminal 1, to perform a setup to connect to an access point using the connection information transmitted from the information processing terminal 1. The electronic device 2 may also have a setup app.

In the present embodiment, the electronic device 2 has already obtained the connection information of the access point 4 and is in a state of being set up to connect to the access point 4. The electronic device 2 is an example of a first electronic device. An electronic device 3, on the other hand, does not have the connection information of the access point 4 and the setup of connecting to the access point 4 is not completed. The electronic device 3 is an example of a second electronic device.

Although the wireless network through the access point 4 is a highly secure wireless network, there may be access points in the vicinity of the electronic device 3 that are connected to a less secure wireless network. However, it is undesirable to connect the electronic device 3 to an access point other than the access point 4. The information processing terminal 1 may or may not be set up to connect to the access point 4. Further, the information processing terminal 1 may be set up to connect to an access point other than the access point 4.

Various procedures for completing the setup of connecting the electronic device 3 to the access point 4 in the communication system 100 of this embodiment will now be described with reference to a sequence diagram and a flowchart. The procedures of the present embodiment are performed, for example, when a new electronic device 3 is added to a wireless network using the access point 4. In the sequence diagram described below, processing of the information processing terminal 1 is executed by the CPU 11, processing of the electronic device 2 is executed by the CPU 21, and processing of the electronic device 3 is executed by the CPU 31.

When adding the new electronic device 3 to a wireless network using the access point 4, the user operates the information processing terminal 1 to launch the information transmission app 121 and takes an image containing the connection information of the access point 4 with the camera 15. The user may display the image including the connection information 222 of the access point 4 on the user IF 23 of the set up electronic device 2 and take the image, or the user may take the image including the connection information 41 printed on the label or the like attached to the access point 4.

A procedure for setting up the new electronic device 3 using the set up electronic device 2 is described with reference to the sequence diagram in FIG. 2. The electronic device 2 is a device connected to the wireless network via the access point 4, and in this procedure, it is assumed that the information processing terminal 1 is not connected to the access point 4.

When receiving a startup instruction from the user, the information processing terminal 1 launches the information transmission app 121 (A01), and sends a display instruction to the electronic device 2 (A02). For example, the information processing terminal 1 determines whether the device information 123 is stored in the memory 12, and if so, the information processing terminal 1 retrieves the device information 123 and obtains information of the electronic device 2 of which setup has been completed. The information processing terminal 1 displays a message to the user IF 13, which message prompts the user IF 13 to hold the information processing terminal 1 over the electronic device 2 that has been set up. When the information processing terminal 1 and the electronic device 2 are connected in accordance with the NFC system, the information processing terminal 1 passes a command to the electronic device 2 indicating the display instructions. The information processing terminal 1 disconnects the connection with the electronic device 2 after passing the command.

Instead of displaying a message prompting the user to hold the electronic device 2 over the electronic device 2, the information processing terminal 1 may display a message on the user IF 13 prompting the user to operate the electronic device 2, which has been set up, to enter a display instruction to display the connection information 222. In that case, the information processing terminal 1 may not send the display instruction to the electronic device 2, while the electronic device 2 may receive the user input of the display instructions for displaying the connection information 222 through the user IF 23.

When the electronic device 2 receives the display instruction, the electronic device 2 launches the image display app 221, retrieves the connection information 222 from the memory 12, and generates an image including the connection information 222. Concretely, the electronic device 2 encrypts the connection information 222 (A03), generates a two-dimensional code containing encrypted information, which is the encrypted connection information, and device information of the electronic device 2 itself, and displays the image of the generated two-dimensional code on the user IF 23 (A04). It is noted that A04 is an example of a displaying process. The two-dimensional code may be a QR code or a proprietary code that can be analyzed by the information transmission app 121.

The information processing terminal 1 activates the camera 15 after sending the display instructions (A05). Before starting the camera 15, the information processing terminal 1 displays a message on the user IF prompting, for example, the user to take the image of the two-dimensional code displayed on the electronic device 2, before starting the camera 15. Before starting the camera 15, the electronic device 2 may be configured to receive a user instruction to activate the camera 15.

When receiving the user operation of the shooting button by the user (A06), the information processing terminal 1 executes the photographing and obtains the image data (A07). In A06, the user photographs a picture, with the camera 15 of the information processing terminal 1, of the two-dimensional code displayed on the user IF 23 of the electronic device 2. Thereby, the information processing terminal 1 obtains the image data of the two-dimensional code. It is noted that the information processing terminal 1 may receive an instruction to check or re-capture the image by the user before A07.

Further, the information processing terminal 1 obtains device information and the encrypted information by analyzing the image represented by the obtained image data (A08). It is noted that A08 is an example of an obtaining process. The information processing terminal 1 determines whether the device information 123 stored in the memory 12 is included in the information acquired in A08. According to the above-described procedure, the electronic device 2 has been set up, and the device information 123 contains the device information of the electronic device 2. Therefore, the information processing terminal 1 determines that the device information 123 stored in the memory 12 is included in the information obtained in A08 (A09). It is noted that A09 is an example of a complete determination process, and is a procedure for determining that there exists an electronic device for which the setup has been completed.

Having determined that the device information of the electronic device 2 is included in the information obtained from the image photographed by the camera 15 and that the device information of the electronic device 2 is included in the device information 123, the information processing terminal 1 starts the setup procedure for setting up the electronic device 3.

The information processing terminal 1 displays a message on the user IF 13 prompting the user to hold the information processing device 1 itself over the NFC-IF 341 of the electronic device 3. When the information processing terminal 1 is held over the electronic device 3 by the user (U01), the information processing terminal 1 and the electronic device 3 wirelessly communicate with each other using NFC and the communication is initiated. The information processing terminal 1 receives the connection information in accordance with the WFD method from the electronic device 3 via NFC-IF 141, and requests the electronic device 3 to connect in accordance with the WFD method. This enables the wireless communication between the information processing terminal 1 and the electronic device 3 in accordance with the WFD method (U02).

The information processing terminal 1 transmits a startup instruction to launch the setup app 321 of the electronic device 3 in accordance with the WFD method (U03). The electronic device 3 launches the setup app 321 (U04) and transmits information, to the information processing terminal 1, indicating that the startup is completed (U05). After receiving the information about the completion of the startup, the information processing terminal 1 transmits information including the connection information of the access point 4 to the electronic device 3 (U06). The electronic device 3 receives the information including the connection information from the information processing terminal 1 at U06. It is noted that U06 is an example of a transmission process and an example of a receiving process.

In this procedure, since the information processing terminal 1 obtains the encrypted information, which is encrypted at the electronic device 2, as the connection information by the image analysis of A08, the information processing terminal 1 transmits the encrypted information as information including the connection information to the electronic device 3 (U06). Since the received information is the encrypted information, the electronic device 3 decrypts the received encrypted information and obtains the connection information 222 (A10). For example, if the electronic device 2 and the electronic device 3 are of the same series of devices, the electronic device 2 and the electronic device 3 have a common encryption function, and the electronic device 3 can decrypt the encrypted information containing the encrypted connection information 222 encrypted at the electronic device 2. By encrypting the connection information 222, the security of the connection information is ensured because the information processing terminal 1 cannot decrypt the encrypted information or use the same.

The electronic device 3 transmits the obtained connection information 222 to the access point 4 and completes the setup (U07). It is noted that U07 is an example of a setup process. When the information processing terminal 1 transmits the encrypted information in U07, the information processing terminal 1 also sends commands to instruct the decryption and setup. The access point 4, which receives the connection information 222, assigns an IP address to the electronic device 3, and transmits the information of the IP address to the electronic device 3 (U08). The electronic device 3, which receives the information of the IP address, transmits a completion notification indicating that the setup is complete and that the device information of the electronic device 3 itself to the information processing terminal 1 (U09). It is noted that U09 is an example of a setup result transmitting process. As the setup is completed, connection information 322 is stored in the memory 32 of the electronic device 3.

Figure 3:
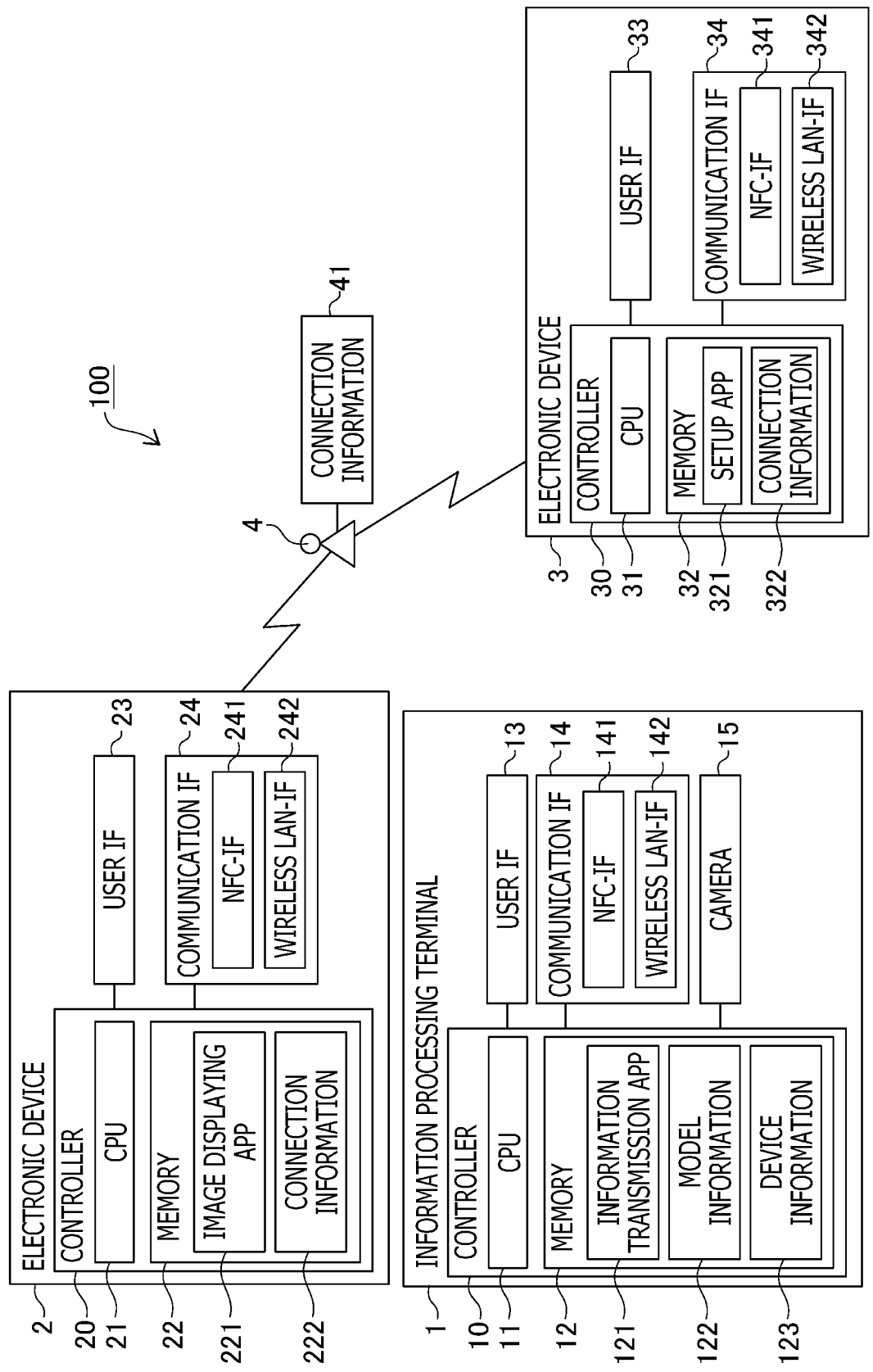
FIG. 3 is a schematic diagram of the communication system after setup.

When receiving the completion notification, the information processing terminal 1 stores the device information indicating the electronic device 3, which is the device that sent the completion notification, i.e., the device that has completed the setup, in the memory 12 as the device information 123 (U10). The information processing terminal 1 then disconnects the electronic device 3 in accordance with the WFD system (U11). Accordingly, the electronic device 2 and the electronic device 3 are connected to the same access point 4, as shown in FIG. 3. According to this procedure, it is not necessary to connect the information processing terminal 1 to the access point 4.

After the setup procedure of U01 to U11, the information processing device 1 deletes the image data obtained at A07 (A20) and terminates the information transmission app 121 (A21). Further, the electronic device 2 terminates the image display app 221 that was launched by the instructions at A02, while the electronic device 3 terminates the setup app 321 that was launched at U04. To realize the above, for example, the information processing terminal 1 may send an instruction to each electronic device 2 and 3 to terminate, the apps may be configured to terminate upon reception of the instruction to terminate from the user, or each app may be automatically terminated after a particular amount of time has elapsed since it was launched.

In this way, by displaying the two-dimensional code including the connection information on the electronic device 2 that has been set up, and further, the device information is contained in the two-dimensional code, the information processing terminal 1 can obtain the connection information and the device information simply by reading the two-dimensional code. Further, based on the device information 123, the information processing terminal 1 can confirm that the device displaying the two-dimensional code is the electronic device 2 that has been set up. The wireless network to which the electronic device 2 with the completed setup is connected can be presumed to be a highly secure wireless network, thereby ensuring the security of the connection information. This procedure allows the user of the information processing terminal 1 to connect the electronic device 3, even if the user of the information processing terminal 1 does not know the location or the connection information of the access point 4.

Next, the procedure for setting up a new electronic device 3 when it is determined that the device information 123 is not included in the device information 123 at A09 in the sequence diagram of FIG. 2 will be described with reference to the sequence diagram of FIG. 4. For example, when it is determined that the device information is not included in the information obtained at A08, or when it is determined that the device information included in the information obtained at A08 is not included in the device information 123, at A09 of the aforementioned sequence diagram of FIG. 2, it is not determined that there is an electronic device that has completes the setup. Further, the procedure in the sequence diagram of FIG. 2 cannot be performed when, for example, there is no electronic device 2 which has been set up, the electronic device 2 cannot be used, the electronic device 2 is occupied by other processes, and so forth, since the two-dimensional code cannot be displayed on the electronic device 2.

Figure 2:
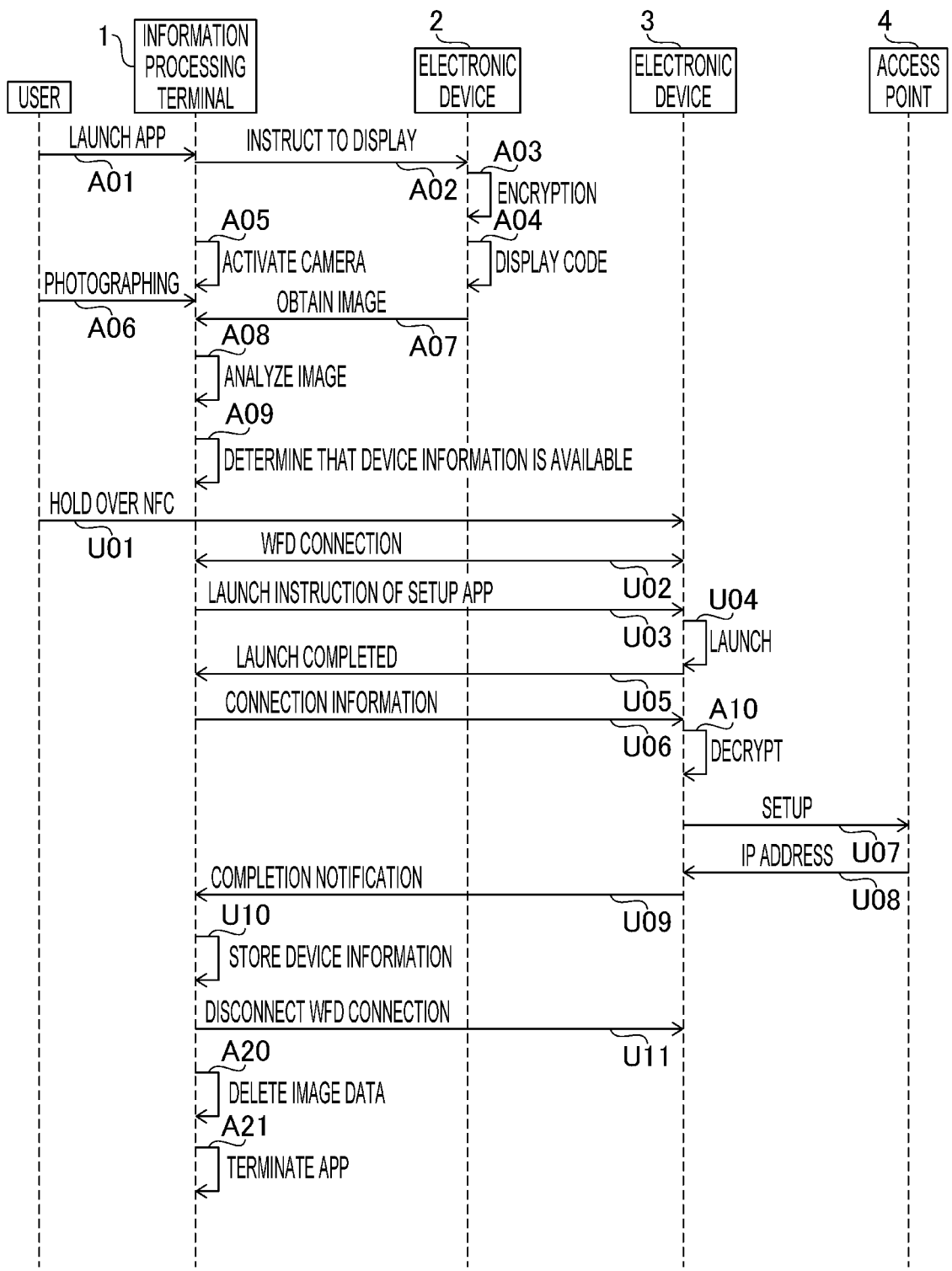
FIG. 2 is a sequence diagram showing a procedure of setting up an electronic device.
Figure 4:
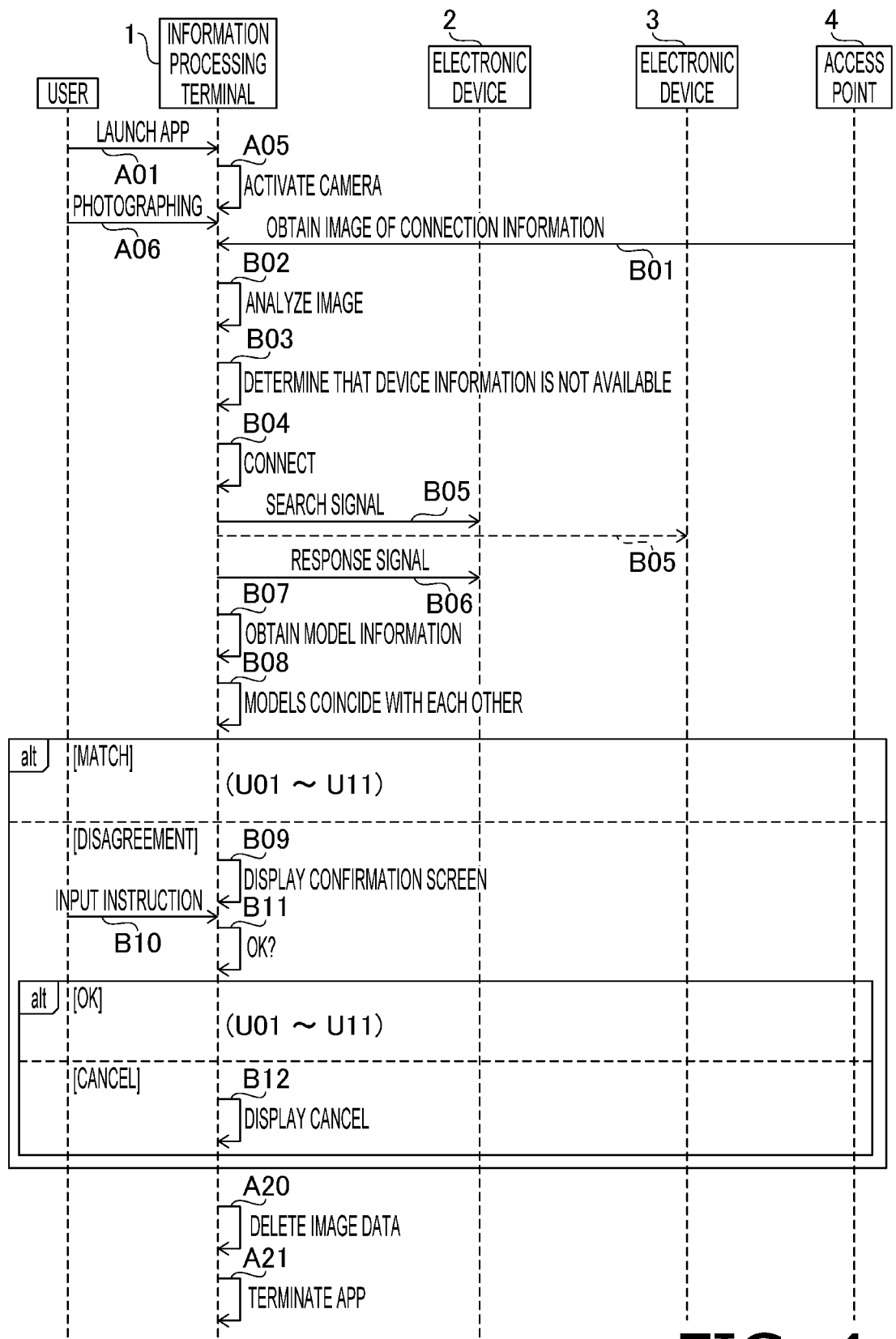
FIG. 4 is a sequence diagram showing a procedure of setting up an electronic device.

When the two-dimensional code cannot be displayed on the electronic device 2, the user performs the procedure shown in FIG. 4 instead of the procedure in FIG. 2. The procedure shown in FIG. 4 is a procedure for setting up a new electronic device 3 without using the electronic device 2 in the communication system 100 shown in FIG. 1. In FIG. 4, the same procedures as the procedures shown in FIG. 2 are assigned with the same reference signs and the description thereof are omitted.

When the information transmission app 121 is launched (A01), the information processing terminal 1 determines whether the device information 123 is stored in the memory 12. When there is no electronic device 2 that has completed the setup, it is determined that the device information 123 is not stored in the memory 12. Even if the device information 123 is stored, when the electronic device 2 cannot be used, the information processing terminal 1 may receive an instruction through the user IF 13 to perform the setup without using the electronic device 2. When the decision is negative at A09 in FIG. 2, the information processing terminal 1 may display a message indicating that the two-dimensional code as read does not contain the device information, and may receive the instruction to set up without using the electronic device 2 through the user IF 13.

The information processing terminal 1 displays a message, on the user IF 13, prompting the user to take a picture of the connection information 41 and activates the camera 15 (A05). The information processing terminal 1 may display a message at A05, for example, prompting the user to take an image of a label containing the connection information 41 of the access point 4.

When receiving the operation of the photographing button by the user (A06), the information processing terminal 1 performs the taking and obtains the image data. In this procedure, since the user photographs a picture of the connection information 41 of the access point 4, the information processing terminal 1 obtains the image data of the image including the connection information 41 of the access point 4 (B01).

When obtaining the image of the connection information, the information processing terminal 1 analyzes the obtained image (B02) and obtains the connection information. It is noted that B02 is an example of the obtaining process. When the taken image is an image of a QR code, information contained in the QR code is read out and the connection information 41 is extracted from the information contained in the QR code. When the taken image is a character image, the connection information 41 is obtained by using a character recognition function. By automatically reading, from the image taken by the camera 15, the connection information 41 can be easily obtained without the need for the user to input the connection information 41. When the obtained image is the character image, the information processing terminal 1 may inquire of the user whether the character recognition result is correct or not, and receive instructions for confirmation or correction.

The information processing terminal 1 then determines whether the device information 123 stored in the memory 12 is included in the information obtained at B02. This determination is the same procedure as in A09 of FIG. 2. When the image taken by the camera 15 is an image of a label or the like of the access point 4, the information obtained in B02 does not include the device information. Further, when there is no electronic device 2 that has completed the setup, the device information 123 is not stored. In either case, the information processing terminal 1 determines that the device information 123 stored in the memory 12 is not included in the information obtained at B02 (B03). It is noted that B03 is an example of a setup completion determining process, and B03 is a procedure of determining that there is no electronic device that has completed the setup.

The information processing terminal 1 causes the information processing terminal 1 itself to connect to the access point 4 indicated by the obtained connection information 41 (B04) after the determination at B03. Concretely, the information processing terminal 1 completes the setup using the obtained connection information 41 and then connects to the information processing terminal 1 itself. It is noted that B04 is an example of a terminal setup process. By performing the setup of the information processing terminal 1 as well, the information processing terminal 1 can use the electronic device 3 via the wireless network. When the setup for connecting to the access point 4 is completed, the information processing terminal 1 omits B04.

The information processing terminal 1 then sends a search signal to search for the electronic device connected to the wireless network via the connected wireless network to which the information processing terminal 1 is connected (B05). When the information processing terminal 1 is connected to the wireless network to which the electronic device 2 is connected, the electronic device 2 receives the search signal sent by the information processing terminal 1. The electronic device 2 transmits a response signal to the information processing terminal 1 in response to the received search signal (B06). It is noted that B06 is an example of a response process. The electronic device 3, on the other hand, does not send the response signal because the setup has not yet been completed and the search signal cannot be received. Accordingly, by connecting to the wireless network based on the obtained connection information and searching for the electronic device connected to the connected wireless network, it is easy to determine whether there exists an electronic device that has completed the setup.

The electronic device 2 transmits a signal containing model information of the electronic device 3 itself as the response signal. The information processing terminal 1 obtains the model information from the received response signal (B07). Further, the information processing terminal 1 refers to the model information 122 stored in association with the information transmission app 121 and determines whether the received response signal is included in the model information 122 (B08). It is noted that B08 is an example of the setup completion determining process.

When it is determined that the model information contained in the received response signal coincides with the model information contained in the model information 122 ([MATCH]), the information processing terminal 1 starts the setup procedure for setting up the electronic device 3. The setup procedure is the same procedure as U01 to U11 in FIG. 2 as described above. A wireless network to which an electronic device of a pre-stored model, to which the electronic device having been set up, is already connected can be presumed to be a secure wireless network. The security of the wireless network is ensured since whether the wireless network in question is the wireless network to which the electronic device 2 is connected based on the response signal.

On the other hand, when a response signal to the search signal is not received within a particular time, when the model information could not be obtained from the received response signal, or when it is determined that the model information 122 does not contain model information that matches the model information contained in the received response signal ([DISAGREEMENT]), the information processing terminal 1 displays a confirmation screen indicating a confirmation message on the user IF 13 (B09) that prompts the user to confirm the acquired connection information (B09) and receives the user's instructional input (B10).

Figure 5:
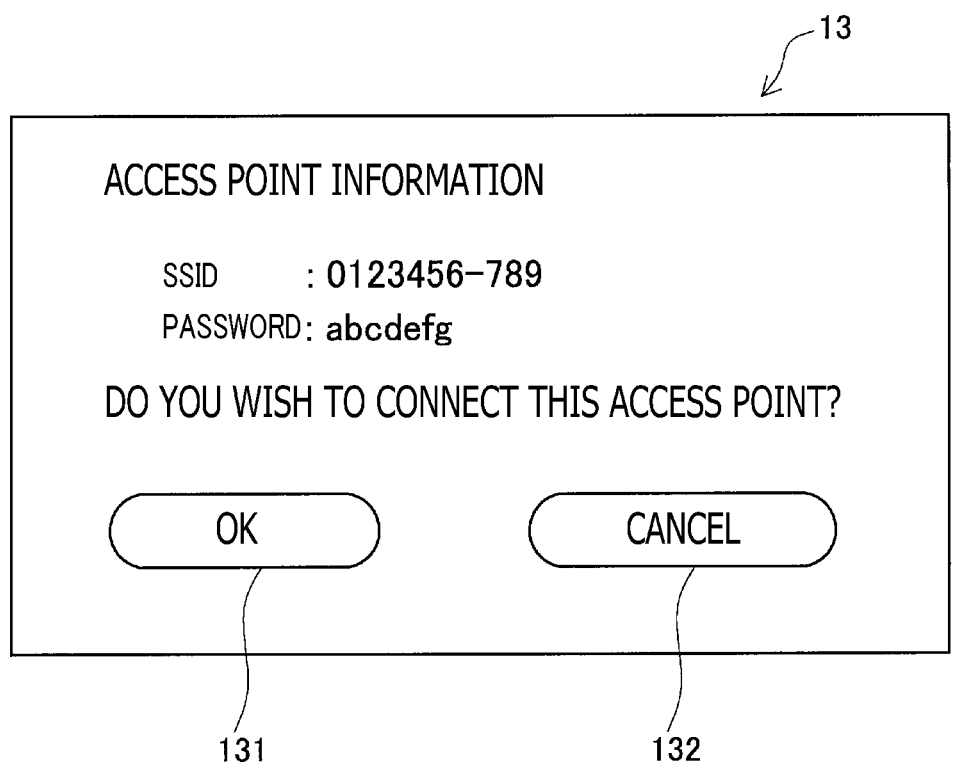
FIG. 5 shows an example of a confirmation screen that accepts confirmation of connection information.

The confirmation screen includes, for example, an SSID and a password, an OK button 131 and a cancel button 132, as shown in FIG. 5. The information processing terminal 1 asks the user, by the confirmation message, whether the displayed information is the connection information 41 of the access point 4 to be connected, and waits until the user operates the input to any of the OK button 131 and the cancel button 132. Then, the information processing terminal 1 determines whether the input to the OK button 131 is received or not (B11). It is noted that B11 is an example of a transmission determining process.

When it is determined that the input to the OK button 131 is accepted ([OK]), the information processing terminal 1 starts a setup procedure for setting up the electronic device 3. The setup procedure is the same procedure as is performed at U01 to U11 in FIG. 2 described above. The input to the OK button 131 is an example of permission information that indicates permission. Sending the connection information confirmed by the user makes it more secure when connecting a new electronic device to the wireless network. Further, by asking the user to input whether to send the connection information, the connection information can be avoided from being sent unnecessarily.

On the other hand, when the input to the cancel button 132 in the screen shown in FIG. 5 is received ([CANCEL]), the information processing terminal 1 does not set up the electronic device 3 and displays information indicating that the setup has been cancelled on the user IF 13 (B12). The input to the cancel button 132 is an example of non-permission information that indicates non-permission. The information processing terminal 1 may receive the image re-photographing. After U11 or B12, the information processing terminal 1 deletes the image data obtained at B01 (A20) and terminates the information transmission app 121 (A21).

According to this procedure, the information processing terminal 1 can obtain the connection information 41 simply by reading the label of the access point 4. By having the user confirm the connection information 41, the wireless network can be presumed to be a highly secure wireless network, thus ensuring the security of the connection information 41. Further, according to this procedure, the information processing terminal 1 transmits the search signal through the wireless network to which the information processing terminal 1 itself is connected and determines whether or not to complete the setup based on the response signal. Furthermore, the setup is completed only when the response signal from the model stored in advance is received, thus ensuring greater security of the wireless network.

Figure 6:
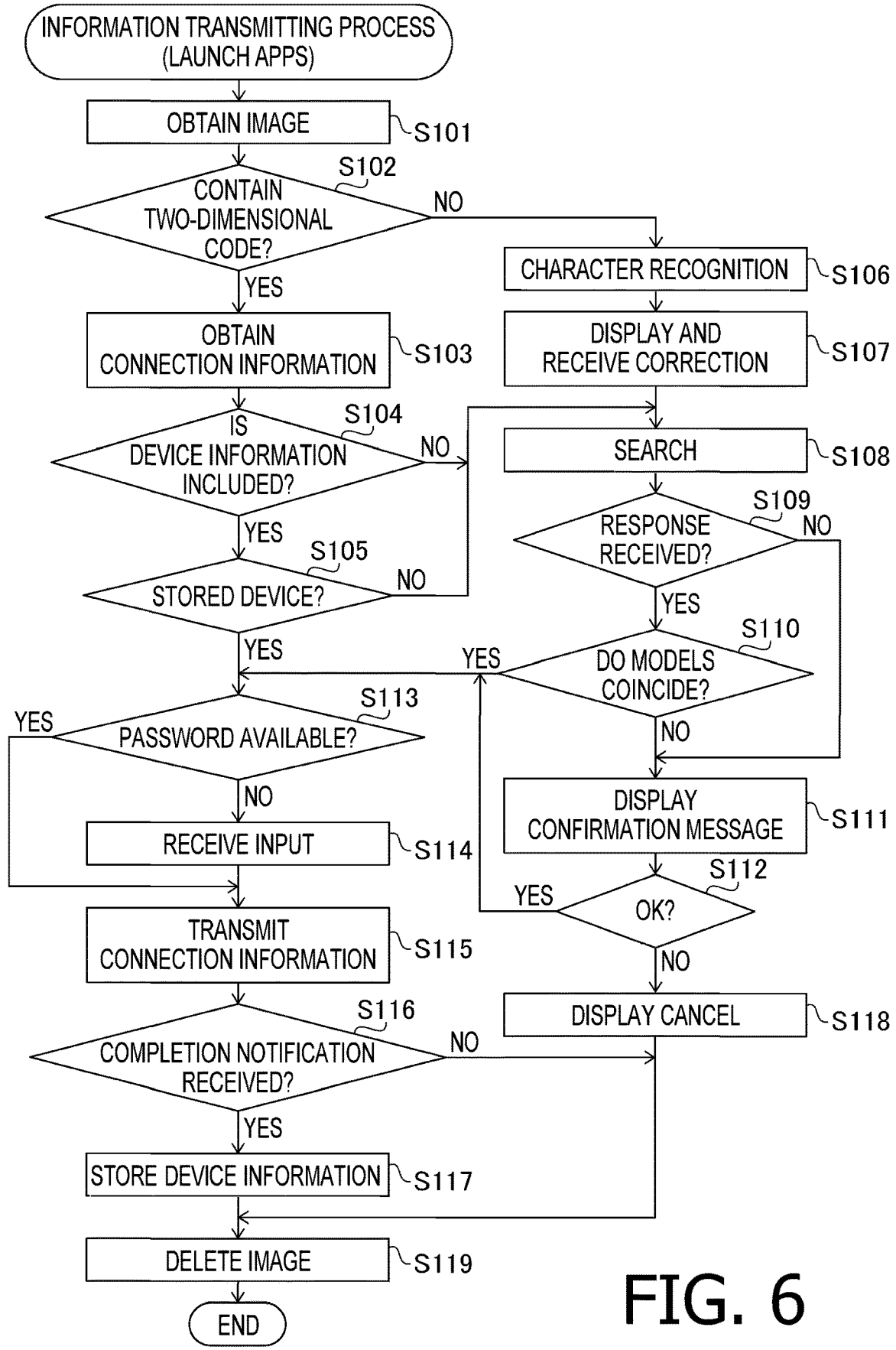
FIG. 6 is a flowchart illustrating a procedure of an information transmitting process.

Next, the procedure of an information transmitting process performed in the information processing terminal 1 of the present embodiment will now be described with reference to the flowchart of FIG. 6. The information transmitting process is executed by the CPU 11 of the information processing terminal 1 in response to the launch of the information transmission app 121. The information transmitting process includes each process of the information processing terminal 1 in each of the aforementioned sequence diagrams.

In the information transmitting process, the CPU 11 first activates the camera 15 and obtains the image data upon receiving a photographing instruction by the user (A07 or B01, S101). The CPU 11 determines whether the image of the obtained image data contains a two-dimensional code (S102). If an object photographed by the user using the camera 15 is a QR code on a label of the access point 4 or the two-dimensional code displayed on the electronic device 2, the image contains a two-dimensional code.

When it is determined that the two-dimensional code is included (S102: YES), the CPU 11 obtains the connection information from the two-dimensional code (S103). When a QR code adhered to the access point or a manual of the wireless network is taken by the camera 15, the connection information can be obtained from the image. Further, the CPU 11 determines whether the device information is included in the two-dimensional code (S104). When the two-dimensional code displayed on the electronic device 2 is taken, the image includes the device information (A09). On the other hand, when the QR code of the access point is photographed, the device information is not included (B03). When it is determined that the device information is included (S104: YES), the CPU 11 further determines whether the device information is stored in the device information 123 (S105).

When it is determined that the image represented by the obtained image data does not contain the two-dimensional code (S102: NO), the CPU 11 performs character recognition of the characters included in the image (S106), and displays the recognition result on the user IF 13 and receives the user's correction (S107). When the character strings that can be determined to be the SSID and the password cannot be obtained by the character recognition, the CPU 11 may display an error message and terminate the process instead of receiving the correction.

After S107, or when it is determined that the two-dimensional code does not contain the device information (S104: NO), or when it is determined that the device information is not included in the device information 123 (S105: NO) (B03), the CPU 11 connects the information processing terminal 1 itself to the wireless network using the obtained connection information via the communication IF 14 (B04) and sends the search signal to search for an electronic device connected to that wireless network (B05, S108).

The CPU 11 then determines whether or not the response signal in response to the search signal is received (S109). When it is determined that a response signal has been received (B06, S109: YES), the CPU 11 determines whether the model information included in the response signal coincides with the model included in the model information 122 (B08, S110).

When it is determined that the response signal in response to the search signal has not been received (S109: NO), or when it is determined that the model does not coincide with the model contained in the model information 122 (at B08 [DISAGREEMENT], S110: NO), the CPU 11 displays a confirmation screen indicating a confirmation message as shown in FIG. 5 on the user IF 13 and receives the input of the user to operate the OK button 131 or the cancel button 132 (B10, S111). The CPU 11 then determines whether the input to the OK button 131 is received or not (B11, S112).

When it is determined that the input to OK button 131 is received (B11: OK, S112: YES), or when it is determined that the model information coincides with the model included in model information 122 (B08: [MATCH], S110: YES), or when it is determined that the device information is contained in the device information 123 (A09, S105: YES), the CPU 11 determines whether the obtained connection information includes both the SSID and the password (S113). For example, the QR code on the label of the access point 4 may not include the password. Further, when the password of the access point 4 has been changed, the user may take an image to include only the SSID. The connection information can be made more secure by asking the user to enter the password when sending the connection information, instead of obtaining the password when the connection information is obtained.

When it is determined that the password is not included in the connection information (S113: NO), the CPU 11 displays an input screen on the user IF 13 to receive the user's input (S114). After S114, or when it is determined that the password is included in the connection information (S113: YES), the CPU 11 transmits the connection information including the SSID and password to the electronic device 3 (U06, S115). In S115, the CPU 11 transmits the connection information after connecting the information processing terminal 1 and the electronic device 3 in accordance with the WFD method, as described above, and launches the setup app 321 of the electronic device 3 (U01 to U05).

After sending the connection information, the CPU 11 determines whether or not a completion notification has been received (S116). When it is determined that the completion notification has been received (U09, S116: YES), the CPU 11 stores the device information of the electronic device 3 in the device information 123 (U10, S117). On the other hand, when it is determined that the input to the cancel button 132 is received through the confirmation screen displayed in S111 (S112: NO), the CPU 11 displays a message on the user IF 13 indicating that the connection to the electronic device has been cancelled (S118).

After S117 or S118, or when it is determined that the completion notification has not been received after the elapse of a particular time (S116: NO), the CPU 11 deletes the image data (S119) and terminates the information transmitting process.

As explained in detail above, where there exists the electronic device 2 which has completed the setup, it is presumed that the access point 4 is highly secure. Accordingly, in such a case, the information processing terminal 1 according to the present embodiment transmits the obtained connection information to the electronic device 3 and causes the electronic device 3 to complete the setup. On the other hand, if there exists no electronic device 2 which has completed the setup, the security of the wireless network cannot be ensured. In this case, the information processing terminal 1 determines whether or not to send the connection information before sending the same, and sends the connection information only when it is determined that the connection information is to be sent. When it is determined that the connection information is not to be sent, the information processing terminal 1 does not send the connection information. This enables the electronic device 3 to avoid being connected to access points of the wireless network unnecessarily, and suppress lowering of the security of the electronic device.

It is noted that the configuration of the above-described embodiment is merely an example and does not limit aspects of the present disclosures in any way. The configuration of the above-described embodiment can naturally be improved and/or modified in various ways within aspects of the present disclosures. For example, the number of devices constituting the communication system 100 is not limited to the number as shown in the accompanying drawings, but may include one or more information processing terminals and one or more electronic devices.

In the embodiment, the information transmitting process including a plurality of procedures is described. It is noted that at least one procedure may be sufficiently effective. Alternatively, it is possible to realize the above-described information processing system as a program set combining a plurality of programs respectively execute the procedures.

In the embodiment, when it is determined that there is no conforming device information (e.g., the device information is not included in QR code, or the device information obtained from the QR code is not included in the device information 123) (NO at B03, S104 or S105), a search signal is sent to check the model information included in the response signal (B04 to B08, S108 to S110). However, such a configuration may be omitted. That is, when it is determined that there is no conforming device information, the information processing terminal 1 may display a confirmation message (B09, S111) and receive the user's input. Alternatively, when it is determined that there is no conforming device information, the information processing terminal 1 may display an error message and terminate the app.

The confirmation screen may be configured to shown another button to instruct re-photographing in addition to the OK button and the cancel button. When the user input (operate) the re-photographing button, the information processing terminal 1 may activate the camera 15 again without terminating the app after deleting the image data and accepting the photographing instruction.

The information displayed on the user IF 23 of the electronic device 2 is not necessarily limited to the two-dimensional code. That is, a one-dimensional code or text information may be displayed. Further, the information displayed on the user IF 23 may not include the device information. That is, the device information 123 may not be used, and the information processing terminal 1 passes the encrypted information to the electronic device 3 without determining the status of the electronic device. Furthermore, the connection information does not need to be encrypted. However, if the connection information is encrypted and the two-dimensional code including the device information is displayed, the security is enhanced.

Further, the response signal may not include the model information. In that case, the information processing terminal 1 does not determine the model of the electronic device. In other words, if there exists an electronic device that sends the response signal, the information processing terminal 1 may send the connection information to the electronic device 3 regardless of the model. Further, in the information transmitting process, when receiving the response signal, the information processing terminal 1 may be configured not to make the user confirm the model of the device. However, if the response signal includes model information and the user is asked to check the same, the security is enhanced.

The above-described embodiment may be modified such that the response signal includes the device information instead of the model information. In that case, the information processing terminal 1 may determine whether the device information 123 is stored, instead of the determination process B08, in the device information obtained from the response signal. Alternatively, the above-described embodiment may be modified such that both the model information and the device information in the response signal.

Optionally, the information processing terminal 1 does not have to be set up the information processing terminal 1 itself. Alternatively, whether the setup of the information processing terminal 1 is to be performed is asked to the user.

According to the above-described embodiment, it is assumed that the electronic device 3 is a device that has not yet completed the setup to connect to the access point 4. However, the electronic device 3 may be a device that has already been set up. In that case, the electronic device 3 may be set up again based on the connection information 222 received from the information processing terminal 1. For example, when the electronic device 3 has received the connection information for the access point 4 while the electronic device 3 has already been set up to connect to an access point different from the access point 4, the electronic device 3 completes the setup so that the electronic device 3 can connect to the access point 4. In this case, the electronic device 3 may delete the connection information of the other access points and store only the connection information of the access point 4.

It is noted that, in any flowchart disclosed in the embodiments, multiple processes in any multiple steps can be arbitrarily changed in an order of execution or executed in parallel within the extent that there is no inconsistency in processing contents.

The processing disclosed in the embodiments and modifications may be executed on hardware such as a single CPU, multiple CPUs, an ASIC, or the like, or a combination thereof. The processing disclosed in the embodiments and modifications may be realized in various embodiments, such as a non-transitory recording medium recording instructions realizing a program for executing the processing, or a method.

What is claimed is:

1. A non-transitory computer-readable recording medium for an information processing terminal having a computer, the recording medium containing computer-executable instructions which realize a program, the instructions cause, when executed by the computer, the information processing terminal to perform:

an obtaining process of obtaining connection information which is used for a setup to connect to an access point of a wireless network;

a setup completion determining process of determining whether there exists an first electronic device having completed the setup;

when it is determined in the setup completion determining process that there does not exist the first electronic device having completed the setup, a transmission determining process of determining whether or not to transmit the connection information obtained in the obtaining process to a second electronic device; and a transmitting process of:

at least one of when it is determined in the setup completion determining process that there exists the first electronic device having completed the setup and when it is determined in the transmission determining process that the connection information is to be transmitted to the second electronic device, transmitting the connection information obtained in the obtaining process to the second electronic device; and when it is determined in the transmission determining process that the connection information is not to be transmitted to the second electronic device, not transmitting the connection information to the second electronic device, the second electronic device being configured to complete the setup using the connection information transmitted, in the transmitting process, from the information processing terminal.

2. The recording medium according to claim 1, wherein the computer-executable instructions further cause, when executed by the computer, the information processing terminal to receive, in the transmission determining process, an input of permission information indicating whether transmission of the connection information to the second electronic device is permitted through a user interface of the information processing terminal when it is determined in the setup completion determining process that there is no first electronic device having completed the setup, and wherein:
when the input of permission information indicates permission, it is determined that the connection information is to be transmitted to the second electronic device in the transmission determining process; and
when the input of permission information indicates non-permission, it is determined that the connection information is not to be transmitted to the second electronic device in the transmission determining process.

3. The recording medium according to claim 1, wherein the computer-executable instructions further cause, when executed by the computer, the information processing terminal to perform:

in the obtaining process:
taking an image including the connection information using a camera of the information terminal; and
obtaining the connection information by analyzing the image taken by the camera,
the first electronic device being capable of displaying the image on a user interface of the first electronic device when the first electronic device has completed the setup to connect to the access point of the wireless network,
device information identifying the first electronic device being contained in the connection information included in the image displayed on the user interface of the first electronic device, and in the setup completion determining process:
determining that there exists the first electronic device having completed the setup when the connection information obtained in the obtaining process includes the device information indicating the first electronic device; and
determining that there exists no first electronic device having completed the setup when the connection information obtained in the obtaining process does not include the device information indicating the first electronic device.

4. The recording medium according to claim 3, wherein the computer-executable instructions further cause, when executed by the computer, the information processing terminal to perform:

in the obtaining process, obtaining the connection information which is encrypted by the first electronic device in accordance with a particular encrypting method, and in the transmitting process, transmitting the encrypted connection information to the second electronic device, the second electronic device receiving the encrypted connection information being configured to perform, when receiving the connection information encrypted ty the first electronic device from the information processing terminal:

decrypting the received connection information; and
completing the setup using the decrypted connection information.

5. The recording medium according to claim 1, wherein the computer-executable instructions further cause, when executed by the computer, the information processing terminal to perform, in the setup completion determining process:

searching for devices connected to the wireless network using the connection information obtained in the obtaining process;

when the first electronic device is detected by the searching, determining that there exists the first electronic device having completed the setup; and when the first electronic device is not detected by the searching, determining that there exists no first electronic device having completed the setup.

6. The recording medium according to claim 5, wherein the computer-executable instructions further cause, when executed by the computer, the information processing terminal to perform, in the setup completion determining process:

searching for devices connected to the wireless network using the connection information obtained in the obtaining process;

obtaining a model of the detected device which is detected by the searching;

when the obtained model coincides with a model which is stored in advance in association with the program, obtaining the model of the detected device; and when the obtained model does not coincide with the model which is stored in advance in association with the program, not determining that the detected device is the first electronic device.

7. The recording medium according to claim 1, wherein the connection information used for the setup includes identification information to identify the wireless network and a password, wherein the computer-executable instructions further cause, when executed by the computer, the information processing terminal to perform, in the transmitting process:
    when the connection information obtained in the obtaining process includes both the identification information and the password, transmitting the connection information obtained in the obtaining process to the second electronic device; and
    when the connection information obtained in the obtaining process includes the identification information but not the password:
        receiving the password through a user interface of the information processing terminal; and
        when the password is received, including the received password into the connection information and transmitting the connection information to the second electronic device.

8. The recording medium according to claim 1,
wherein the computer-executable instructions further cause, when executed by the computer, the information processing terminal to perform, in the obtaining process:
    taking an image including the connection information with a camera of the information processing terminal;
    extracting the connection information by analyzing the image;
    controlling a user interface of the information processing terminal to display the extracted connection information; and
    receiving an input by a user indicating whether the extracted connection information is correct; and
    when the input by the user indicates that the extracted connection information is correct, obtaining the connection information as extracted.

9. The recording medium according to claim 1,
wherein the computer-executable instructions further cause, when executed by the computer, the information processing terminal to perform:
    when a completion notification of the setup is received from the second electronic device, a terminal setup process of performing the setup to connect the information processing terminal to an access point of the wireless network using the connection information obtained in the obtaining process,
    wherein the second electronic device transmits the completion notification to the information processing terminal after the second electronic device has completed the setup using the connection information received from the information processing terminal.

10. A non-transitory computer-readable recording medium for an information processing terminal having a computer, the recording medium containing computer-executable instructions which cause, when executed by the computer, the information processing terminal to perform:
    an obtaining process of obtaining connection information which is used for a setup to connect to an access point of a wireless network;
    a setup completion determining process of determining whether there exists a first electronic device having completed the setup; and
    a transmitting process of:
        transmitting the connection information obtained in the obtaining process to a second electronic device when it is determined, in the setup completion determining process, that there exists the first electronic device having completed the setup; and
        not transmitting the connection information to the second electronic device when it is determined, in the setup completion determining process, that the exists no first electronic device having completed the setup,
    wherein the second electronic device is configured to complete the setup using the connection information received from the information processing terminal.

11. An electronic device, comprising:
a communication interface; and
a computer,
wherein the computer is configured to perform a receiving process of receiving connection information used for a setup to connect to an access point of a wireless network from an information processing terminal through the communication interface,
the information processing terminal being configured to perform:
    obtaining the connection information; and
    transmitting the obtained connection information to the electronic device at least one of when it is determined that there exists an other electronic device, which is different from the electronic device, having completed the setup and when the connection information is to be transmitted to the electronic device even if there exists no other electronic device having completed the setup,
wherein the computer is further configured to perform, when the connection information is received in the receiving process:
    a setup process of completing the setup using the received connection information; and
    a setup result transmitting process of transmitting a result of the setup in the setup process to the information processing terminal through the communication interface.

12. The electronic device according to claim 11, further comprising a user interface having a displaying function,
    wherein the computer is configured to perform, when the setup has been completed a displaying process of display an image including the connection information on the user interface, the connection information included in the image containing device information identifying the electronic device, the information processing terminal being configured to perform:
        taking the image with a camera of the information processing terminal;
        obtaining the connection information by analyzing the image; and
        determining that the electronic device has completed the set up when the obtained connection information includes the device information identifying the electronic device.

13. The electronic device according to claim 11,
wherein the computer is configured to perform, when the setup has been completed, a response process of transmitting a response signal to the information processing terminal through the communication interface when a search signal of a device is received from the information processing terminal through the communication interface,
wherein the information processing terminal is configured to determine that the electronic device has completed the setup when the information processing terminal receives the response signal.

\* \* \* \* \*

UNITED STATES PATENT AND TRADEMARK OFFICE
CERTIFICATE OF CORRECTION

PATENT NO. : 11,405,526 B2
APPLICATION NO. : 17/210777
DATED : August 2, 2022
INVENTOR(S) : Kazuaki Ogawa Page 1 of 1

It is certified that error appears in the above-identified patent and that said Letters Patent is hereby corrected as shown below:

On the Title Page

Item (57), Abstract, Line 5 should read:
device having completed a setup. When determining that In the Claims Column 17, Claim 1, Line 8 should read:
whether there exists a first electronic device having Signed and Sealed this
Twenty-seventh Day of June, 2023

Katherine Kelly Vidal
*Director of the United States Patent and Trademark Office*